(12) United States Patent
Gong

(10) Patent No.: US 9,880,650 B1
(45) Date of Patent: Jan. 30, 2018

(54) DRIVER CIRCUIT FOR TOUCH PANEL

(71) Applicant: Wuhan China Star Optoelectronics Technology Co., Ltd., Wuhan (CN)

(72) Inventor: Qiang Gong, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 190 days.

(21) Appl. No.: 14/913,997

(22) PCT Filed: Jan. 29, 2016

(86) PCT No.: PCT/CN2016/072847
§ 371 (c)(1),
(2) Date: Feb. 24, 2016

(87) PCT Pub. No.: WO2017/107292
PCT Pub. Date: Jun. 29, 2017

(30) Foreign Application Priority Data

Dec. 23, 2015 (CN) .......................... 2015 1 0980039

(51) Int. Cl.
*G06F 3/041* (2006.01)
(52) U.S. Cl.
CPC .......... *G06F 3/0412* (2013.01); *G06F 3/0416* (2013.01)

(58) Field of Classification Search
CPC ........ G09G 2310/0286; G09G 3/3266; G09G 2300/0408; G09G 2310/0267; G06F 3/0416; G06F 3/0412
See application file for complete search history.

(56) References Cited

U.S. PATENT DOCUMENTS

| 2011/0096027 | A1* | 4/2011 | Jeon | G06F 3/0412 345/175 |
| 2016/0170525 | A1* | 6/2016 | Zhai | G06F 3/044 345/174 |
| 2016/0179258 | A1* | 6/2016 | Fan | G06F 1/06 345/173 |
| 2016/0378242 | A1* | 12/2016 | Huang | G06F 3/0416 345/173 |
| 2017/0003775 | A1* | 1/2017 | Hu | G06F 3/044 |

* cited by examiner

*Primary Examiner* — Premal R Patel
(74) *Attorney, Agent, or Firm* — Leong C. Lei

(57) ABSTRACT

The invention provides a touch driver circuit, by only using a select signal (Select) to control the operation of transport gates (TG1, TG2) to realize output of a valid pulse touch driver signal (TXH) and a constant low voltage signal (TXL). The circuit structure is simplified, and removes a plurality of elements and two control signals so as to reduce the layout space occupied by the touch driver circuit as well as reduced the border width of the touch display to realize narrow border design for touch display panel.

11 Claims, 5 Drawing Sheets

DRIVER CIRCUIT FOR TOUCH PANEL

BACKGROUND OF THE INVENTION

1. Field of the Invention

The present invention relates to the field of display, and in particular to a driver circuit for touch panel.

2. The Related Arts

In the rapid development of display technology, the liquid crystal display (LCD) and organic light-emitting diode (OLED) display have the advantages of high display quality, low power-consumption, and thin, and are widely used in applications, such as, mobile phone, TV, personal digital assistant (PDA), digital camera, notebook PC, desktop PC, and so on, and become the mainstream display technology.

A touch panel provides an effective and direct interface for human-machine interaction interface. By integrating the touch panel with the flat display into a touch display panel, the flat display panel with a touch control capability allows the users to operate in a more direct, intuitive and convenient way. The embedded touch display panel refers to the type that integrates the touch panel and the display panel into a single panel, and embeds the touch control function to the display panel so that the display panel can display as well as detect touch inputs. The embedded type provides a thinner, better transmittance and contrast, and low cost option among the touch display panels. The embedded type further comprises a hybrid in-cell touch display panel, that is, forming touch driver electrodes on one side of the array substrate by using common electrodes, and forming touch sensing electrodes on one side of the color filter (CF) substrate by using back-electroplated Indium Tin Oxide (ITO).

The known hybrid in-cell touch display panel forms a driver circuit similar to the gate driver on array (GOA) circuit on one side of the array substrate so that the touch driver electrode can scan line-by-line. FIG. 1 shows a schematic view of a touch driver circuit in known hybrid in-cell touch display panel, comprising: a plurality of cascade touch driver units, each touch driver unit comprising: a cascading unit 100, a selection unit 200, and an output unit 300; for a positive integer N, except the first touch driver unit, in an N-th touch driver unit:

The cascading unit 100 comprises: a first NOT gate F1, with the input end connected to an M-th clock signal CK(M) and the output end connected to a low voltage control end of a first tri-state NOT gate SF1 and a high voltage control end of a second tri-state NOT gate SF2; the first tri-state NOT gate SF1 having the input end connected to a cascading signal ST(N−1) of an (N−1)-th touch driver unit, output end connected to the output end of second tri-state NOT gate SF2, the high voltage control end connected to the M-th clock signal CK(M), and the low voltage control end connected to the output end of first tri-state NOT gate SF1; the second tri-state NOT gate SF2 having the input end connected to the output end of a second NOT gate F2, the output end connected to the output end of first tri-state NOT gate SF1, the high voltage control end connected to the output end of the first NOT gate F1 and the low voltage control end connected to the M-th clock signal CK(M); the second NOT gate F2 having the input end connected to the output end of first tri-state NOT gate SF1 and the output end of second tri-state NOT gate SF2, and the output end connected to the input end of second tri-state NOT gate SF2 and outputting a cascading signal ST(N) of the N-th driver unit; a first P-type thin film transistor (TFT) T1, having the gate connected to a reset signal Reset, the source connected to a constant high voltage VGH, and the drain connected to the input end of second NOT gate F2; and a NAND gate YF1, having the first input end connected to the output end of second NOT gate F2, the second input end connected to the (M+1)-th clock signal CK(M+1), and the output end connected to a selection signal Select.

The selection unit 200 comprises: a third NOT gate F3, with the input end connected to the output end of NAND gate YF1 to receive the selection signal SELECT, and the output end connected to the input end of a fourth NOT gate F4; the fourth NOT gate having the output end connected to the gate of a second N-type TFT T2; the second N-type TFT having the source connected to a constant low voltage VGL and the drain connected to the input end of a fifth NOT gate F5; a first transport gate TG1 having a high voltage control end connected to the output end of third NOT gate F3, a low voltage control end connected to the output end of fourth NOT gate F4, an input end connected to a first control signal TXSW, and an output end connected to the input end of fifth NOT gate F5; a second transport gate TG2, having a high voltage control end connected to the output end of third NOT gate F3, a low voltage control end connected to the output end of fourth NOT gate F4, an input end connected to a first control signal TXSW, and an output end connected to the input end of ninth NOT gate F9; and a third transport gate TG3, having high voltage control end connected to the output end of fourth NOT gate F4, a low voltage control end connected to the output end of third NOT gate F3, an input end connected to a second control signal HRSW, and an output end connected to the input end of ninth NOT gate F9; a second transport gate TG2.

The output unit 300 comprises: the fifth NOT gate, with the output end connected to the input end of a sixth NOT gate F6; the sixth NOT gate, with the output end connected to the input end of a seventh NOT gate F7; the seventh NOT gate, with the output end connected to the low voltage control end of a fourth transport gate TG4; an eighth NOT gate F8, with the input end connected to the output end of fifth NOT gate F5, and the output end connected to the high voltage control end of the fourth transport gate TG4; the fourth transport gate TG4, having the input end connected to a valid pulse touch driver signal TXH, and the output end connected to a driver output end OUT(N); the ninth NOT gate F9, with the output end connected to the input end of a tenth NOT gate F10; the tenth NOT gate F10, with the output end connected to the input end of an eleventh NOT gate F11; the eleventh NOT gate F11, with the output end connected to the high voltage control end of a fifth transport gate TG5; a twelfth NOT gate F12, with the input end connected to the output end of the ninth NOT gate F9, and the output end connected to the low voltage control end of fifth transport gate TG5; and the fifth transport gate TG5, having the input end connected to a constant low voltage signal TXL, and the output end connected to the output end of the touch driver circuit OUT(N).

In the touch driver circuit for the hybrid in-cell embedded touch display panel in FIG. 1, the selection signal Select outputted from the output end of NAND gate YF1, in collaboration with the first control signal TXSW and the second control signal HRSW, controls the touch driver circuit to operate in different modes. When the selection signal Select is low and the first control signal TXSW is high, the touch driver circuit achieves to output the valid pulse touch driver signal TXH in the cascading manner (i.e., stage by stage); when the selection signal Select is high and the second control signal HRSW is low, the circuit outputs the constant low voltage signal TXL; when the selection signal Select is high and the second control signal HRSW is also high, the touch driver circuit is in a high impedance operation mode.

Although the touch driver circuit in the above known hybrid embedded touch display panel can effectively reduce the number of output ports in the integrated circuit (IC), the number of the signals and elements are too many, which leads to occupying too much space by the touch driver circuit, and not suitable for narrow border design of the touch display panel.

SUMMARY OF THE INVENTION

The object of the present invention is to provide a touch driver circuit, simplifying the circuit structure by reducing the number of the elements and the number of signals, reducing the space occupied by the touch driver circuit so as to reduce the border width of the touch display panel to realize the narrow-border touch display panel.

To achieve the above object, the present invention provides a touch driver circuit, which comprises a plurality of cascading touch driver units, each touch driver unit comprising: a cascading unit, and an output unit; for a positive integer N, except the first touch driver unit, in an N-th touch driver unit: the cascading unit comprising: a first NOT gate, with an input end connected to an M-th clock signal and an output end connected to a low voltage control end of a first tri-state NOT gate and a high voltage control end of a second tri-state NOT gate; the first tri-state NOT gate, having an input end connected to a cascading signal of an (N−1)-th touch driver unit, an output end connected to an output end of second tri-state NOT gate, a high voltage control end connected to the M-th clock signal, and the low voltage control end connected to the output end of first NOT gate; the second tri-state NOT gate, having an input end connected to an output end of a second NOT gate, an output end connected to the output end of first tri-state NOT gate, the high voltage control end connected to the output end of the first NOT gate, and a low voltage control end connected to the M-th clock signal; the second NOT gate, having an input end connected to the output end of first tri-state NOT gate and the output end of second tri-state NOT gate, and an output end connected to the input end of second tri-state NOT gate and outputting a cascading signal of the N-th driver unit; a first P-type thin film transistor (TFT), having a gate connected to a reset signal, a source connected to a constant high voltage, and a drain connected to the input end of second NOT gate; and a NAND gate, having a first input end connected to the output end of second NOT gate, a second input end connected to the (M+1)-th clock signal, and an output end outputting a selection signal; the output unit comprising: a third NOT gate, having an input end connected to the output end of NAND gate to receive the selection signal, an output end connected to an input end of a fourth NOT gate; the fourth NOT gate, having an output end connected to an input end of a fifth NOT gate; the fifth NOT gate, having an output end connected to an input end of a sixth NOT gate; the sixth NOT gate, having an output end connected to a low voltage control end of a first transport gate and a high voltage control end of a second transport gate; a seventh NOT gate, having an input end connected to the output of the fourth NOT gate, an output end connected to a high voltage control end of the first transport gate and a low voltage control end of the second transport gate; the first transport gate, having an input end receiving a valid pulse touch driver signal; an output end connected an output end of the touch driver circuit; and the second transport gate, having an input end connected to a constant low voltage signal, and an output end connected to the output end of the touch driver circuit.

When the selection signal outputted by the NAND gate is high, the touch driver circuit outputs the valid pulse touch driver signal.

When the selection signal outputted by the NAND gate is low, the touch driver circuit outputs the constant low voltage signal.

When the M-th clock signal is high, the first tri-state NOT gate and the second NOT gate operate, and the cascading signal of the (N−1)-th touch driver unit propagates to the N-th touch driver unit; when the M-th clock signal is low, the second tri-state NOT gate and the second NOT gate operate to latch the cascading signal of the (N−1)-th touch driver unit.

The valid pulse touch driver signal has a pulse period less than the pulse period of the clock signal.

The touch driver circuit for a hybrid embedded touch display panel has two clock signals: a first clock signal and a second clock signal.

When the M-th clock signal is the first clock signal, the (M+1)-th clock signal is the second clock signal; when the M-th clock signal is the second clock signal, the (M+1)-th clock signal is the first clock signal.

In the first touch driver unit, the first tri-state NOT gate has the input end connected to a circuit activation signal, the first NOT gate has the input end connected to the first clock signal; and the NAND gate has the second input end connected to the second clock signal.

The present invention also provides a touch driver circuit, which comprises a plurality of cascading touch driver units, each touch driver unit comprising: a cascading unit, and an output unit; for a positive integer N, except the first touch driver unit, in an N-th touch driver unit: the cascading unit comprising: a first NOT gate, with an input end connected to an M-th clock signal and an output end connected to a low voltage control end of a first tri-state NOT gate and a high voltage control end of a second tri-state NOT gate; the first tri-state NOT gate, having an input end connected to a cascading signal of an (N−1)-th touch driver unit, an output end connected to an output end of second tri-state NOT gate, a high voltage control end connected to the M-th clock signal, and the low voltage control end connected to the output end of first NOT gate; the second tri-state NOT gate, having an input end connected to an output end of a second NOT gate, an output end connected to the output end of first tri-state NOT gate, the high voltage control end connected to the output end of the first NOT gate, and a low voltage control end connected to the M-th clock signal; the second NOT gate, having an input end connected to the output end of first tri-state NOT gate and the output end of second tri-state NOT gate, and an output end connected to the input end of second tri-state NOT gate and outputting a cascading signal of the N-th driver unit; a first P-type thin film transistor (TFT), having a gate connected to a reset signal, a source connected to a constant high voltage, and a drain connected to the input end of second NOT gate; and a NAND gate, having a first input end connected to the output end of second NOT gate, a second input end connected to the (M+1)-th clock signal, and an output end outputting a selection signal; the output unit comprising: a third NOT gate, having an input end connected to the output end of NAND gate to receive the selection signal, an output end connected to an input end of a fourth NOT gate; the fourth NOT gate, having an output end connected to an input end of a fifth NOT gate; the fifth NOT gate, having an output end connected to an input end of a sixth NOT gate; the sixth NOT gate, having an output end connected to a low voltage control end of a first transport gate and a high voltage control end of a second transport gate; a seventh NOT gate, having an input end connected to the output of the fourth NOT gate, an output end connected to a high voltage control end of the first transport gate and a low voltage control end of the second transport gate; the first transport gate, having an input end receiving a valid pulse touch driver signal; an output end connected an output end of the touch driver circuit; and the second transport gate, having an input end connected to a constant low voltage signal, and an output end connected to the output end of the touch driver circuit; wherein when the selection signal outputted by the NAND gate is high, the touch driver circuit outputs the valid pulse touch driver signal; wherein when the selection signal outputted by the NAND gate is low, the touch driver circuit outputs the constant low voltage signal; wherein when the M-th clock signal is high, the first tri-state NOT gate and the second NOT gate operate, and the cascading signal of the (N−1)-th touch driver unit propagates to the N-th touch driver unit; when the M-th clock signal is low, the second tri-state NOT gate and the second NOT gate operate to latch the cascading signal of the (N−1)-th touch driver unit; wherein the valid pulse touch driver signal has a pulse period less than the pulse period of the clock signal; wherein the touch driver circuit for a hybrid embedded touch display panel has two clock signals: a first clock signal and a second clock signal.

Compared to the known techniques, the present invention provides the following advantages: the present invention provides a touch driver circuit, by only using a select signal to control the operation of the transport gates to realize the output of the valid pulse touch driver signal and constant low voltage signal. The circuit structure is simplified, and removes a plurality of elements and two control signals so as to reduce the layout space occupied by the touch driver circuit as well as reduced the border width of the touch display to realize narrow border design for touch display panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 3:
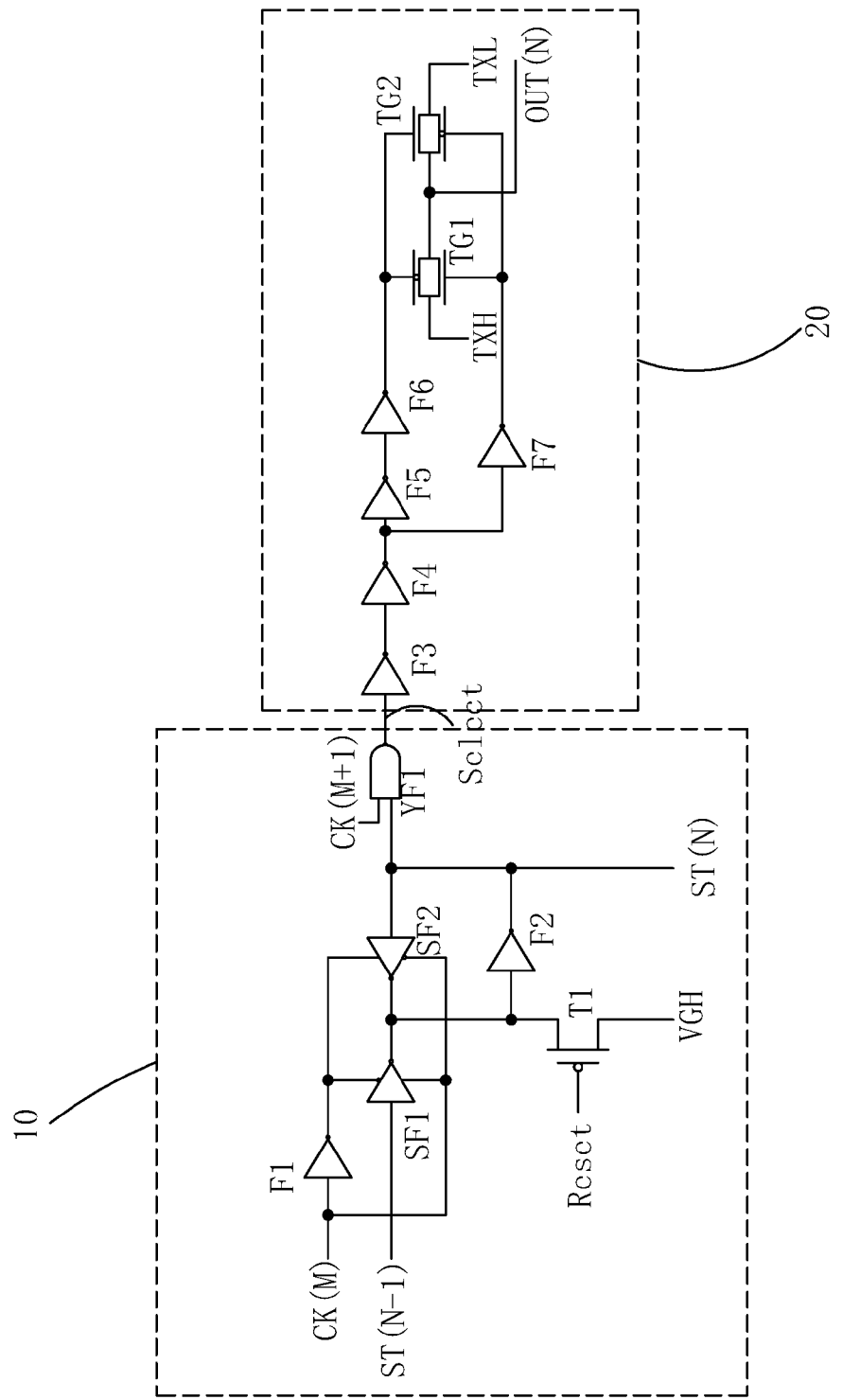
FIG. 3 is a schematic view showing the touch driver circuit provided by an embodiment of the present invention.
Figure 4:
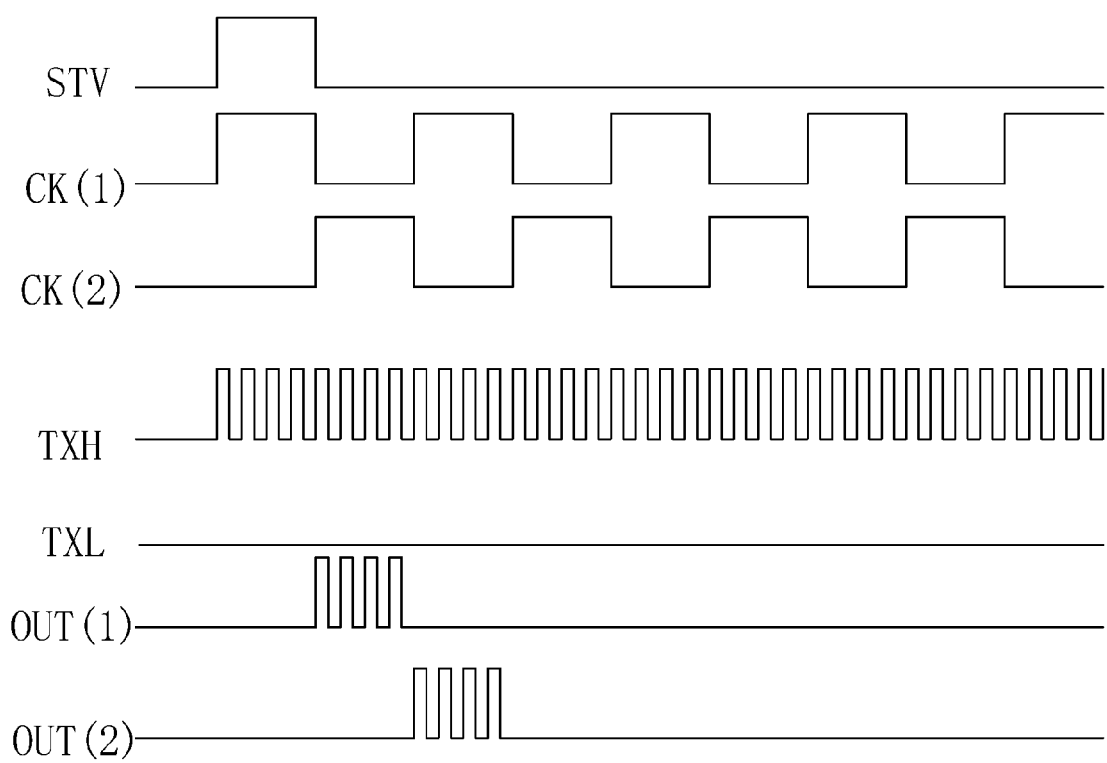
FIG. 4 is a schematic view showing the timing of the touch driver circuit in FIG. 3.

Refer to FIG. 3 and FIG. 4. The present invention provides a touch driver circuit, which comprises a plurality of cascading touch driver units, each touch driver unit comprising: a cascading unit 10, and an output unit 20.

For a positive integer N, except the first touch driver unit, in an N-th touch driver unit:

The cascading unit 10 comprises: a first NOT gate F1, with an input end connected to an M-th clock signal CK(M) and an output end connected to a low voltage control end of a first tri-state NOT gate SF1 and a high voltage control end of a second tri-state NOT gate SF2;

The first tri-state NOT gate SF1, having an input end connected to a cascading signal ST(N−1) of an (N−1)-th touch driver unit, an output end connected to an output end of second tri-state NOT gate SF2, the high voltage control end connected to the M-th clock signal CK(M), and the low voltage control end connected to the output end of first NOT gate F1;

The second tri-state NOT gate SF2, having an input end connected to an output end of a second NOT gate F2, an output end connected to the output end of first tri-state NOT gate SF1, the high voltage control end connected to the output end of the first NOT gate F1, and a low voltage control end connected to the M-th clock signal CK(M);

The second NOT gate F2, having an input end connected to the output end of first tri-state NOT gate SF1 and the output end of second tri-state NOT gate SF2, and an output end connected to the input end of second tri-state NOT gate SF2 and outputting a cascading signal ST(N) of the N-th driver unit;

A first P-type thin film transistor (TFT) T1, having a gate connected to a reset signal Reset, a source connected to a constant high voltage VGH, and a drain connected to the input end of second NOT gate F2; and a NAND gate YF1, having a first input end connected to the output end of second NOT gate F2, a second input end connected to the (M+1)-th clock signal CK(M+1), and an output end outputting a selection signal Select;

The output unit 20 comprising:

A third NOT gate F3, having an input end connected to the output end of NAND gate YF1 to receive the selection signal Select, an output end connected to an input end of a fourth NOT gate F4;

The fourth NOT gate F4, having an output end connected to an input end of a fifth NOT gate F5;

The fifth NOT gate F5, having an output end connected to an input end of a sixth NOT gate F6;

The sixth NOT gate F6, having an output end connected to a low voltage control end of a first transport gate TG1 and a high voltage control end of a second transport gate TG2;

A seventh NOT gate F7, having an input end connected to the output of the fourth NOT gate F4, an output end connected to a high voltage control end of the first transport gate TG1 and a low voltage control end of the second transport gate TG2;

The first transport gate TG1, having an input end receiving a valid pulse touch driver signal TXH, an output end connected an output end OUT(N) of the touch driver circuit; and The second transport gate TG2, having an input end connected to a constant low voltage signal TXL, and an output end connected to the output end OUT(N) of the touch driver circuit.

Specifically, when the M-th clock signal CK(M) is high, the first tri-state NOT gate SF1 and the second NOT gate F2 operate, and the cascading signal ST(N−1) of the (N−1)-th touch driver unit propagates to the N-th touch driver unit; when the M-th clock signal is low CK(M), the second tri-state NOT gate SF2 and the second NOT gate F2 operate to latch the cascading signal ST(N−1) of the (N−1)-th touch driver unit.

When the selection signal Select outputted by the NAND gate YF1 is high, the output end OUT(N) of touch driver circuit outputs the valid pulse touch driver signal TXH; when the selection signal Select outputted by the NAND gate YF1 is low, the output end OUT(N) of the touch driver circuit outputs the constant low voltage signal TXL.

Moreover, the valid pulse touch driver signal THX has a pulse period less than the pulse period of the clock signal.

Each touch driver unit receives two clock signals: a first clock signal CK(1) and a second clock signal CK(2). When the M-th clock signal CK(M) is the first clock signal CK(1), the (M+1)-th clock signal CK(M+1) is the second clock signal CK(2); when the M-th clock signal CK(M) is the second clock signal CK(2), the (M+1)-th clock signal CK(M+1) is the first clock signal CK(1). The first clock signal CK(1) and the second clock signal CK(2) alternatingly connect to the input end of the first NOT gate F1 and the second input end of the NAND gate YF1 in each touch driver unit. For example, in the first touch driver unit, the input end of the first NOT gate F1 is connected to the first clock signal CK(1), and the second input of NAND gate YF1 is connected to the second clock signal CK(2); in the second touch driver unit, the input end of the first NOT gate F1 is connected to the second clock signal CK(2), and the second input of NAND gate YF1 is connected to the first clock signal CK(1); in the third touch driver unit, the input end of the first NOT gate F1 is connected to the first clock signal CK(1), and the second input of NAND gate YF1 is connected to the second clock signal CK(2); and so on.

The transport gate comprises an N-type TFT and a P-type TFT, wherein the get of the N-type TFT is used as the high voltage control end of the transport gate, and the gate of the P-type TFT is used as the low voltage control end of the transport gate. The source of the N-type TFT and the source of the P-type TFT are connected together to act as the input end of the transport gate. The drain of the N-type TFT and the drain of the P-type TFT are connected together to act as the output end of the transport gate.

The first tri-state NOT gate SF1 and the second tri-state NOT gate SF2 act as a control switch. When the high voltage control end is connected to a high level (logic 1) and the low voltage control end is connected to a low level (logic 0), the tri-state NOT gate operates as the normal NOT gate (i.e., the output end is 0 when the input end is 1; the output end is 1 when the input end is 0); when the high voltage control end is connected to a low level (logic 0) and the low voltage control end is connected to a high level (logic 1), the tri-state NOT gate operates as a resistor with high impedance, which is considered as no current to flow through in a digital circuit, i.e., cut-off.

Figure 5:
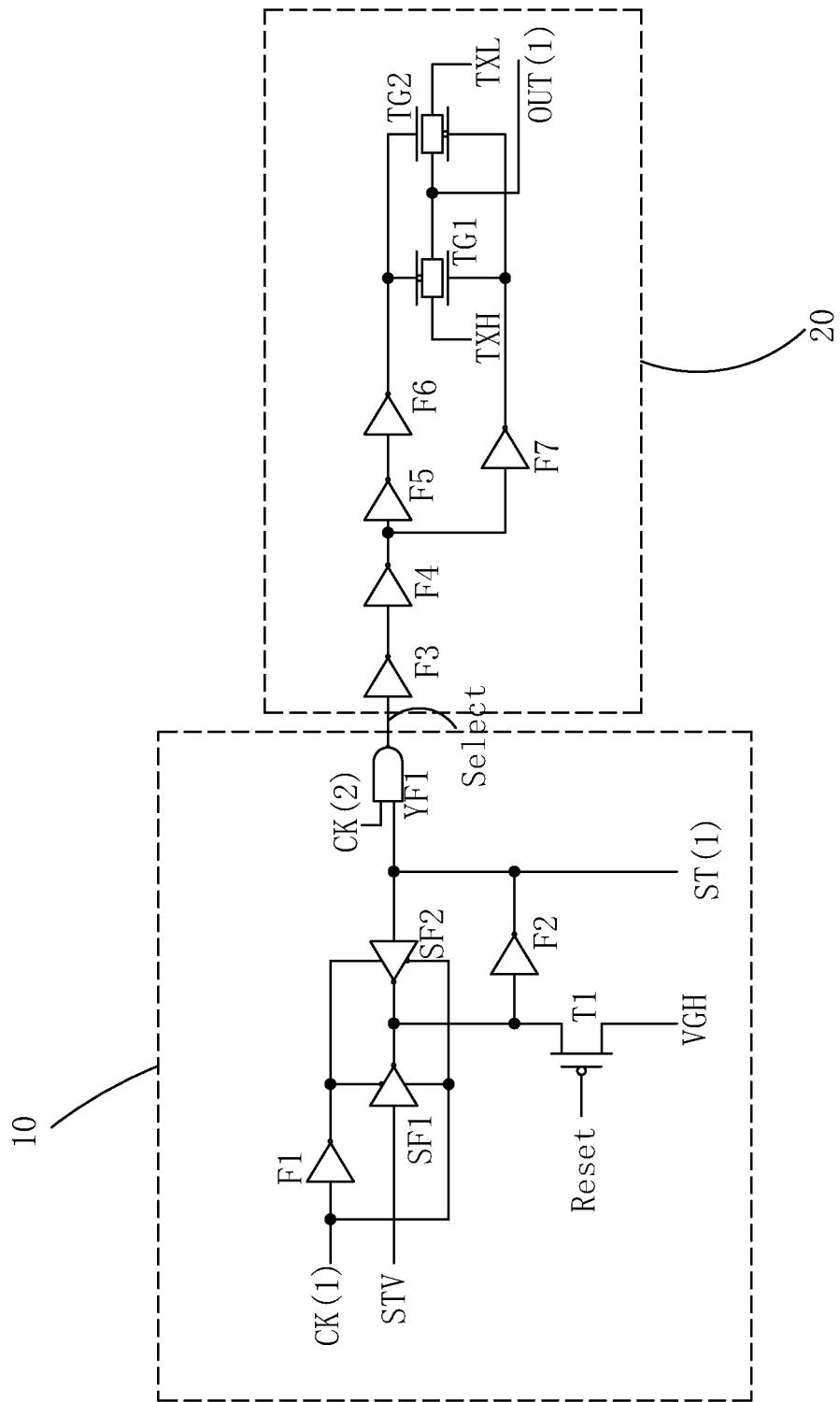
FIG. 5 is a schematic view showing the first touch driver unit in the touch driver circuit provided by an embodiment of the present invention.

Specifically, referring to FIG. 5, in the first touch driver unit, the first tri-state NOT gate SF1 has the input end connected to a circuit activation signal STV.

Refer to FIGS. 3 and 5 and FIG. 4. The touch driver circuit for the hybrid embedded touch display panel of the present invention operates as follow.

First, the M-th clock signal CK(M) and the cascading signal ST(N−1) from the (N−1)-th touch driver unit (in the first touch driver unit, the circuit activation signal STV) both provide high level voltage, and the (M+1)-th clock signal provides a low level voltage. The high level voltage of the M-th clock signal CK(M) is provided directly to the high voltage control end of the first tri-state NOT gate SF1 and the low voltage control end of the second tri-state NOT gate SF2, and is inverted by the first NOT gate F1 to become a low level voltage provided to the low voltage control end of the first tri-state NOT gate SF1 and the high voltage control end of the second tri-state NOT gate SF2. At this point, the first tri-state NOT gate Sf1 operates and the second tri-state NOT gate SF2 is cut-off. The cascading signal ST(N−1) of the (N−1)-th touch driver unit is inverted twice by the first tri-state NOT gate SF1 and the second NOT gate F2 to provide a high level voltage to the first input end of the NAND gate YF1. The (M+1)-th clock signal is at low level, and the output end of the NAND gate YF1 outputs the selection signal Select at high level. The selection signal Select passes through the third, fourth, fifth and sixth NOT gates F3, F4, F5, F6 to provide a high level voltage to the low voltage control end of the first transport gate TG1 and the high voltage control end of the second transport gate TG2. At the same time, the selection signal Select passes through the third, fourth, and seventh NOT gates F3, F4, F7 to provide a low level voltage to the high voltage control end of the first transport gate TG1 and the low voltage control end of the second transport gate TG2. The first transport gate TG1 is turned off and the second transport gate operates. The output end OUT(N) of the touch driver circuit outputs the constant low voltage signal TXL.

Then, the M-th clock signal CK(M) becomes low and the (M+1)-th clock signal CK(M+1) becomes high. The second tri-state NOT gate SF2 operates and the first tri-state NOT gate SF1 is cut-off. The second tri-state NOT gate SF2 and the second NOT gate F2 operate together to latch the cascading signal ST(N−1) of the (N−1)-th touch driver unit at high level, and keep the first input end of the NAND gate YF1 at high level. The selection signal Select becomes low. The selection signal Select passes through the third, fourth, fifth and sixth NOT gates F3, F4, F5, F6 to provide a low level voltage to the low voltage control end of the first transport gate TG1 and the high voltage control end of the second transport gate TG2. At the same time, the selection signal Select passes through the third, fourth, and seventh NOT gates F3, F4, F7 to provide a low level voltage to the high voltage control end of the first transport gate TG1 and the low voltage control end of the second transport gate TG2. The first transport gate TG1 operates and the second transport gate is cut-off. The output end OUT(N) of the touch driver circuit outputs the valid pulse touch driver signal TXH.

Finally, the M-th clock signal CK(M) become high again, and the (M+1)-th clock signal CK(M+1) becomes low. The second tri-state NOT gate SF2 is cut-off and the first tri-state NOT gate SF1 operates. The cascading signal ST(N−1) of the (N−1)-th touch driver unit becomes low, and the cascading signal ST(N−1) of the (N−1)-th touch driver unit passes through the first tri-state NOT gate Sf1 and the second NOT gate F2 to reach the first input end of the NAND gate Yf1. Because the first input end of the NAND gate YF1 is at a constant low level, the selection signal SELECT outputted by the output end of the NAND gate Yf1 is at the constant high level. The first transport gate TG1 is cut-off and the second transport gate TG2 operates, and the output end OUT(N) of the touch driver circuit outputs the constant low voltage signal TXL.

Figure 1:
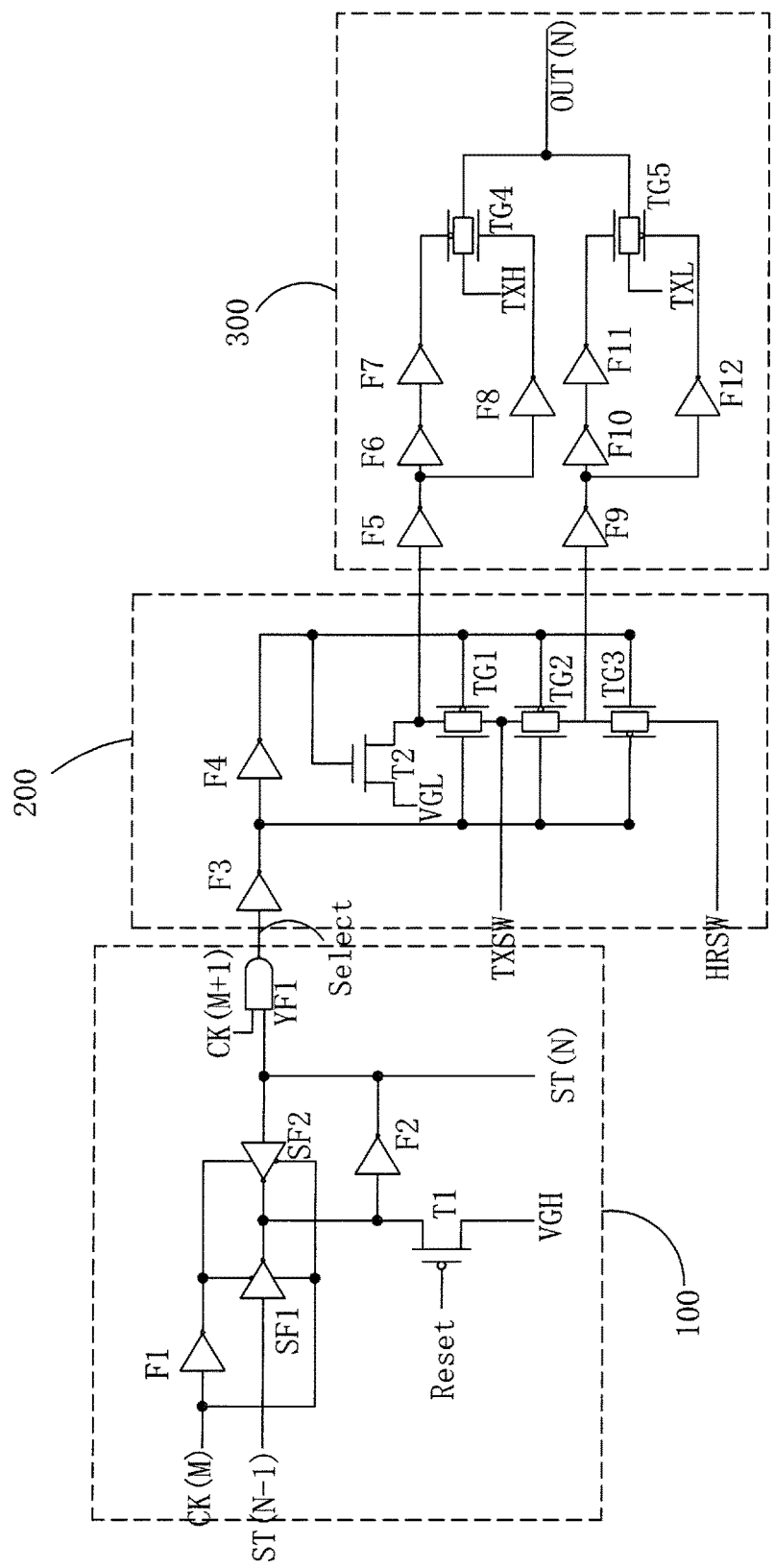
FIG. 1 is a schematic view showing a known touch driver circuit for a hybrid embedded touch display panel.
Figure 2:
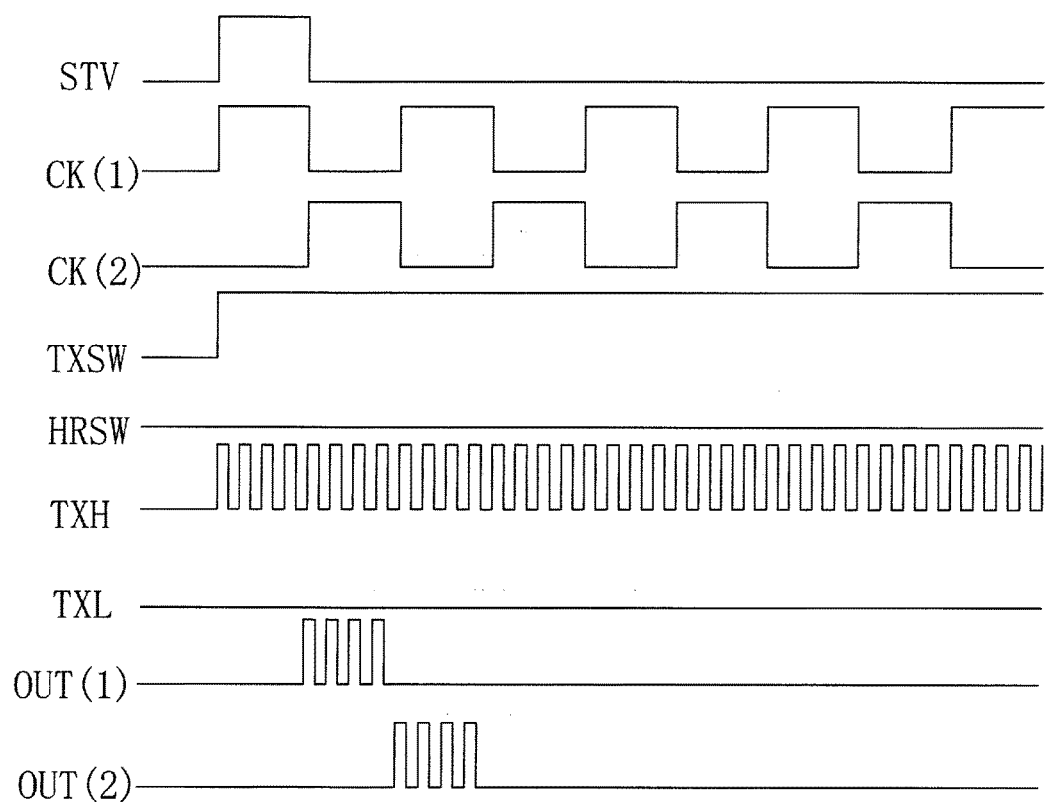
FIG. 2 is a schematic view showing the timing for the touch driver circuit in FIG. 1.

The touch driver circuit of the present invention ensures functioning normally. Compared to the known touch driver circuit for hybrid embedded touch display panel in FIG. 1, the present invention removes the selection unit 200, the first control signal TXSW and the second control signal HRSW. Moreover, the output unit 20 of the present invention has a simpler structure to reduce the number of elements and control signals, so as to reduce the layout space occupied by the touch driver circuit and reduce the border width of the touch display panel.

In summary, the present invention provides a touch driver circuit, by only using a select signal to control the operation of the transport gates to realize the output of the valid pulse touch driver signal and constant low voltage signal. The circuit structure is simplified, and removes a plurality of elements and two control signals so as to reduce the layout space occupied by the touch driver circuit as well as reduced the border width of the touch display to realize narrow border design for touch display panel.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A touch driver circuit, which comprises a plurality of cascading touch driver units, each touch driver unit comprising: a cascading unit, and an output unit;

for a positive integer N, except the first touch driver unit, in an N-th touch driver unit:

the cascading unit comprising:

a first NOT gate, with an input end connected to an M-th clock signal and an output end connected to a low voltage control end of a first tri-state NOT gate and a high voltage control end of a second tri-state NOT gate;

the first tri-state NOT gate, having an input end connected to a cascading signal of an (N−1)-th touch driver unit, an output end connected to an output end of second tri-state NOT gate, a high voltage control end connected to the M-th clock signal, and the low voltage control end connected to the output end of first NOT gate;

the second tri-state NOT gate, having an input end connected to an output end of a second NOT gate, an output end connected to the output end of first tri-state NOT gate, the high voltage control end connected to the output end of the first NOT gate, and a low voltage control end connected to the M-th clock signal;

the second NOT gate, having an input end connected to the output end of first tri-state NOT gate and the output end of second tri-state NOT gate, and an output end connected to the input end of second tri-state NOT gate and outputting a cascading signal of the N-th driver unit;

a first P-type thin film transistor (TFT), having a gate connected to a reset signal, a source connected to a constant high voltage, and a drain connected to the input end of second NOT gate; and a NAND gate, having a first input end connected to the output end of second NOT gate, a second input end connected to the (M+1)-th clock signal, and an output end outputting a selection signal;

the output unit comprising:

a third NOT gate, having an input end connected to the output end of NAND gate to receive the selection signal, an output end connected to an input end of a fourth NOT gate;

the fourth NOT gate, having an output end connected to an input end of a fifth NOT gate;

the fifth NOT gate, having an output end connected to an input end of a sixth NOT gate;

the sixth NOT gate, having an output end connected to a low voltage control end of a first transport gate and a high voltage control end of a second transport gate;

a seventh NOT gate, having an input end connected to the output of the fourth NOT gate, an output end connected to a high voltage control end of the first transport gate and a low voltage control end of the second transport gate;

the first transport gate, having an input end receiving a valid pulse touch driver signal; an output end connected an output end of the touch driver circuit; and the second transport gate, having an input end connected to a constant low voltage signal, and an output end connected to the output end of the touch driver circuit.

2. The touch driver circuit as claimed in claim 1, wherein when the selection signal outputted by the NAND gate is high, the output end of the touch driver circuit outputs the valid pulse touch driver signal.

3. The touch driver circuit as claimed in claim 1, wherein when the selection signal outputted by the NAND gate is low, the output end of the touch driver circuit outputs the constant low voltage signal.

4. The touch driver circuit as claimed in claim 1, wherein when the M-th clock signal is high, the first tri-state NOT gate and the second NOT gate operate, and the cascading signal of the (N−1)-th touch driver unit propagates to the N-th touch driver unit; when the M-th clock signal is low, the second tri-state NOT gate and the second NOT gate operate to latch the cascading signal of the (N−1)-th touch driver unit.

5. The touch driver circuit as claimed in claim 1, wherein the valid pulse touch driver signal has a pulse period less than the pulse period of the clock signal.

6. The touch driver circuit as claimed in claim 1, wherein the touch driver circuit for a hybrid embedded touch display panel has two clock signals: a first clock signal and a second clock signal.

7. The touch driver circuit as claimed in claim 6, wherein when the M-th clock signal is the first clock signal, the (M+1)-th clock signal is the second clock signal; when the M-th clock signal is the second clock signal, the (M+1)-th clock signal is the first clock signal.

8. The touch driver circuit as claimed in claim 7, wherein in the first touch driver unit, the first tri-state NOT gate has the input end connected to a circuit activation signal, the first NOT gate has the input end connected to the first clock signal; and the NAND gate has the second input end connected to the second clock signal.

9. A touch driver circuit, which comprises a plurality of cascading touch driver units, each touch driver unit comprising: a cascading unit, and an output unit;
for a positive integer N, except the first touch driver unit, in an N-th touch driver unit:
the cascading unit comprising:
a first NOT gate, with an input end connected to an M-th clock signal and an output end connected to a low voltage control end of a first tri-state NOT gate and a high voltage control end of a second tri-state NOT gate;
the first tri-state NOT gate, having an input end connected to a cascading signal of an (N−1)-th touch driver unit, an output end connected to an output end of second tri-state NOT gate, a high voltage control end connected to the M-th clock signal, and the low voltage control end connected to the output end of first NOT gate;
the second tri-state NOT gate, having an input end connected to an output end of a second NOT gate, an output end connected to the output end of first tri-state NOT gate, the high voltage control end connected to the output end of the first NOT gate, and a low voltage control end connected to the M-th clock signal;
the second NOT gate, having an input end connected to the output end of first tri-state NOT gate and the output end of second tri-state NOT gate, and an output end connected to the input end of second tri-state NOT gate and outputting a cascading signal of the N-th driver unit;
a first P-type thin film transistor (TFT), having a gate connected to a reset signal, a source connected to a constant high voltage, and a drain connected to the input end of second NOT gate; and
a NAND gate, having a first input end connected to the output end of second NOT gate, a second input end connected to the (M+1)-th clock signal, and an output end outputting a selection signal;
the output unit comprising:
a third NOT gate, having an input end connected to the output end of NAND gate to receive the selection signal, an output end connected to an input end of a fourth NOT gate;
the fourth NOT gate, having an output end connected to an input end of a fifth NOT gate;
the fifth NOT gate, having an output end connected to an input end of a sixth NOT gate;
the sixth NOT gate, having an output end connected to a low voltage control end of a first transport gate and a high voltage control end of a second transport gate;
a seventh NOT gate, having an input end connected to the output of the fourth NOT gate, an output end connected to a high voltage control end of the first transport gate and a low voltage control end of the second transport gate;
the first transport gate, having an input end receiving a valid pulse touch driver signal; an output end connected an output end of the touch driver circuit; and
the second transport gate, having an input end connected to a constant low voltage signal, and an output end connected to the output end of the touch driver circuit;
wherein when the selection signal outputted by the NAND gate is high, the output end of the touch driver circuit outputs the valid pulse touch driver signal;
wherein when the selection signal outputted by the NAND gate is low, the output end of the touch driver circuit outputs the constant low voltage signal;
wherein when the M-th clock signal is high, the first tri-state NOT gate and the second NOT gate operate, and the cascading signal of the (N−1)-th touch driver unit propagates to the N-th touch driver unit;
when the M-th clock signal is low, the second tri-state NOT gate and the second NOT gate operate to latch the cascading signal of the (N−1)-th touch driver unit;
wherein the valid pulse touch driver signal has a pulse period less than the pulse period of the clock signal;
wherein the touch driver circuit for a hybrid embedded touch display panel has two clock signals: a first clock signal and a second clock signal.

10. The touch driver circuit as claimed in claim 9, wherein when the M-th clock signal is the first clock signal, the (M+1)-th clock signal is the second clock signal; when the M-th clock signal is the second clock signal, the (M+1)-th clock signal is the first clock signal.

11. The touch driver circuit as claimed in claim 10, wherein in the first touch driver unit, the first tri-state NOT gate has the input end connected to a circuit activation signal, the first NOT gate has the input end connected to the first clock signal; and the NAND gate has the second input end connected to the second clock signal.

* * * * *